(12) United States Patent
Asch (10) Patent No.: US 7,373,604 B1
(45) Date of Patent: May 13, 2008

(54) AUTOMATICALLY SCALABLE PRESENTATION OF VIDEO DEMONSTRATION CONTENT

(75) Inventor: Arlyn Asch, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 741 days.

(21) Appl. No.: 10/856,428

(22) Filed: May 28, 2004

(51) Int. Cl.
*G06F 3/00* (2006.01)
(52) U.S. Cl. .................. 715/723; 715/704; 715/705
(58) Field of Classification Search .................. 715/723
See application file for complete search history.

(56) References Cited

U.S. PATENT DOCUMENTS 5,696,702 A * 12/1997 Skinner et al. ............. 702/186
6,236,395 B1 * 5/2001 Sezan et al. ................ 715/723
6,629,635 B1 * 10/2003 Akamine ..................... 235/454

OTHER PUBLICATIONS

Techsmith. "SnagIt: Getting Started Guide." Copyright Nov. 21, 2003.*

* cited by examiner

*Primary Examiner*—Doug Hutton
*Assistant Examiner*—Soumya Dasgupta
(74) *Attorney, Agent, or Firm*—Fulbright & Jaworski LLP

(57) ABSTRACT

A system and method are disclosed for creating an electronic demonstration. The method includes capturing video of a demonstrated process that includes a plurality of steps. Each of the steps are analyzed to determine if the steps may be represented by a single frame. In response to analyzing the steps, one or more of the frames of video among the steps that may be represented as a single still motion screen shot may be deleted. The remaining frames are then assembled into an electronic demonstration movie.

34 Claims, 8 Drawing Sheets

AUTOMATICALLY SCALABLE PRESENTATION OF VIDEO DEMONSTRATION CONTENT

CROSS-REFERENCE TO RELATED APPLICATIONS

The present application is related to concurrently filed, co-pending, and commonly assigned U.S. patent application Ser. No. 10/856,429, entitled "SEAMLESS INTEGRATION OF VIDEO CAPTURE IN DEMONSTRATION APPLICATIONS," the disclosure of which is hereby incorporated herein by reference.

TECHNICAL FIELD

The present invention relates, in general, to electronic demonstration methods and systems, and more specifically, to the automatic scalability of a presentation of video demonstration content.

BACKGROUND OF THE INVENTION

Computers and computer technology have greatly increased the efficiency and capability of the individuals who use them. What historically required hours of re-typing and reams of carbon paper 30 years ago, can now typically be accomplished in minutes by a single person operating a word processing application. Spreadsheets, word processors, publishing software, electronic mail, and the like, each add some level of increased capability and simplicity to a user's life. However, with this increased capability a new responsibility has been added to the user: learning how to use this software.

An increase in software training techniques has closely followed the increased use and availability of such productivity software applications. In its simplest form, training is essentially the process of drafting a large user's manual and letting the user read through it to learn the operation of the product. However, a relatively large amount of time may be expended reading through a manual in order to find out specifics on how to operate a given product to perform a specific, desired task. Today, software training, at least in the context of corporations or businesses may be maintained and directed by Information Technology (IT) trainers.

An IT trainer may attempt to train people how to use various software applications, such as email, word processors, and the like, being used at the business. These IT trainers may provide a helpdesk to field calls or questions from employees asking how to perform specific tasks on the software product. Additionally, IT trainers may take a more proactive approach by providing written materials to people explaining and demonstrating the use of the specific product or the steps to take to perform a specific task. One solution for developing such materials would be to write the explanations and steps into a word processing document for distribution to the users. These how-to guides may include screen shots indicating how the product will respond with pop-up windows or dialog boxes along with explanations of what the user should do in response to the pop-up windows, dialog boxes, or the like.

Software applications have been developed to assist IT trainers in creating these instructional materials by recording the demonstrator's or trainer's interaction with the actual software product being demonstrated. Examples of such demonstration development environments include MACROMEDIA INC.'s ROBODEMO™, TECHSMITH CORPORATION'S CAMTASIA™, QARBON, INC.'s VIEWLETBUILDER™, and the like. Demonstration development software allows trainers to record actual simulations of the software to be demonstrated in order to demonstrate that software or how to use a particular feature of that software. The resulting recorded demonstration can then be made available to the users either electronically or on paper. In the electronic media, demonstration applications, such as ROBODEMO™, may record the trainer interaction onto an interactive multimedia movie file that may be played on a user's computer using an interactive multimedia runtime container (iMRC), such as MACROMEDIA INC.'s MACROMEDIA FLASH™ player.

While systems presently available are able to record in full motion, these system are limited in their operation as the ability to edit the recorded files is minimal. In addition, the recording of every single step performed in conducting a demonstrated application in full video without the ability to later alter the recorded video to minimize the file size is inconvenient. Although the recording of every step in full motion may clearly capture every single movement, it produces very large files which often pose problems concerning file size limitations. Often times, not every single step recorded in performing a demonstration process needs to be represented in a full motion video clip.

BRIEF SUMMARY OF THE INVENTION

The present invention is directed to a system and method that records demonstrated steps performed in a computer environment in full motion video. The system may then automatically scale the resulting demonstration movie in such a manner so that steps that do not have to be presented as a full motion video clip may be scaled down to a single applicable screen shot. The system and method may be configured to record a variety of steps and operations.

The system monitors the various steps or operations that are being recorded to determine if the recorded activity should be represented as a full motion video clip or as a single still motion screen shot. In monitoring the recorded steps, the system analyzes the recorded steps and categorizes the steps as either a full motion step or a still motion step. After the steps are categorized, the recording system modifies the steps based on how the various steps were categorized. A frame labeled as representative of a still motion step will be maintained while other steps that are duplicative may be deleted.

After the recorded data is modified, the recording system then assembles/compiles the frame that represents the still motion step and the video clip representing the full motion step into an electronic demonstration movie. The demonstration movie may be assembled into any one of a MACROMEDIA FLASH™ file format (SWF), a MACINTOSH PROJECTOR™ file format (HQX), an executable movie file format (EXE), a hypertext markup language movie file format (HTML), and the like. A small web file (SWF) may be used so that replay may be implemented within a simple framework, such as an interactive multimedia runtime container (iMRC) like the MACROMEDIA FLASH™ player.

The recording system may also be arranged such that an IT trainer is able to edit the various frames (both the frame representing the still motion step and the frames that represent the full motion step) before they are assembled into the demonstration movie. The recording system may also provide the IT trainer with an opportunity to edit the assembled demonstration movie. The editing may be accomplished by an IT trainer using an interactive multimedia application environment (iMAE), such as MACROMEDIA INC.'S MACROMEDIA FLASH™.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
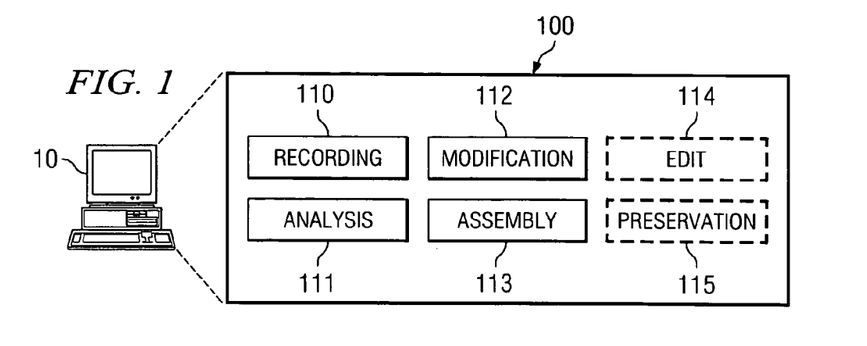
FIG. 1 is an illustration of a general architecture of a system of the present invention.

FIG. 1 is a diagram illustrating demonstration development environment 100 implemented on computer 10 for creating electronic demonstration movies or presentations according to one embodiment of the present invention. The electronic demonstration movie may be created from recording a series of demonstrated steps or operations performed within computer 10.

Demonstration development environment 100 represents one application running on computer 10. In one embodiment, demonstration development environment 100 includes recording module 110, analysis module 111, modification module 112, and assembly module 113. Demonstration development environment 100 is advantageous because it is able to record all activity in full motion video and then automatically reduce the file size of the recorded steps by representing some of the steps as a single still motion screen shot.

Recording module 110 records the various steps or tasks that are the subject of the demonstration movie. The recording is conducted so that all activity of every step is captured in full motion video regardless of the step performed. When recording in full motion video, recording module 110 records the demonstrated steps as a plurality of frames whereby a frame is a single image in a series of consecutive images in a motion picture representing some action or activity where the captured frame or frames may be played back at a later time. For example, if an IT trainer were simply depressing a mouse button to select a file, or if the IT trainer were conducting a drag and drop procedure, every action performed in conducting the depressing of the mouse button or in conducting the drag and drop procedure may be represented as a plurality of frames. The frames may be captured over a time period so than any one frame of the plurality of frames may represent the specific action that occurred at a specific time along a time line representing the time in which the particular step was performed. Capturing all actions in full motion video as a plurality of frames is advantageous because all actions performed in carrying out a step or operation will be recorded. The recording system may operate so that recording module 110 records in any one of a number of various full motion graphic file formats, such as an audio video interleave (AVI) file, a windows media video (WMV) file, an advanced streaming format (ASF) file, a flash video (FLV) file, a Moving Pictures Experts Group (MPEG) file, and the like.

In one embodiment, recording module 10 may capture video of the demonstrated steps in multiple tracks. The multiple tracks may comprise one track of screen data, one track of pointer image data, one track of keyboard data, one track of object action data, and the like. The track of screen data may capture what is happening on the screen so that actual screen changes may be captured. The pointer image data track may capture how a pointer, such as a mouse, moves and what actions it took along the way. The keyboard data track may capture keyboard actions, such as which keys are pressed and when they are depressed. The object action data may capture details of the actions performed, such as the nature of the object that is selected by the IT trainer, the parent objects of the object, properties of both the objects, and the like. All tracks are synchronized in time so that the recorded tracks correspond and align with one another.

Analysis module 111 analyzes the recorded steps. The recorded steps are analyzed to determine if any of the steps may be represented by a single still motion screen shot instead of a full motion video clip. If the steps can be represented by a single still motion screen shot, then the recording system may scale the frames making up that step down into a single still motion screen shot by representing that step as one single frame from the plurality of frames making up that particular step. Analysis module 111 may include logic that will analyze the type of action being performed that makes up the recorded step, and if the type of action is one that would be better represented by a full motion video clip, then analysis module 111 may designate that activity as a full motion step so that the step will remain as a full motion video clip.

In analyzing the recorded steps, analysis module 111 may analyze each individual frame from the plurality of frames making up the step undergoing analysis. By analyzing each frame, analysis module 111 may evaluate the amount of change among successive frames from one frame to the next.

The nature of the change among successive frames may then be used as a basis in determining if a particular step can be adequately represented by a single still motion shot or a full motion video clip. For example, in the step of depressing a mouse button, there may be little to no change between successive frames of the plurality of frames making up the step of depressing the mouse button. Therefore, analysis module 111 may determine that the step of depressing a mouse button can be represented by a single still motion screen shot instead of a full motion video clip. In this case, analysis module 111 may signify one frame of the plurality of frames making up the step of depressing the mouse button as a representative frame of the analyzed step. The remaining frames may be classified as duplicative. On the other hand, in the step of performing a drag and drop procedure, there may exist a significant amount of change between successive frames of the plurality of frames making up the step of performing a drag and drop procedure. Thus, analysis module 111 may determine that the step of performing a drag and drop procedure should be represented by a full motion video clip. In this instance, analysis module 111 may signify all frames of the plurality of frames making up the drag and drop step as representative of the analyzed step.

In an alternative embodiment of the present invention, analysis module 111 may include a list of actions stored in a memory array or a database that signifies the actions that can be represented as a single still motion screen shot instead of a full motion video clip. In such an embodiment, as actions are performed, analysis module 111 may check the list of actions to determine if an action performed is in the list. If an action performed is in the list, then analysis module 111 may signify one frame of the plurality of frames making up the listed action as a representative frame of the action. The remaining frames may be classified as duplicative. For example, the list may include the step of closing a window. Thus, when an IT trainer closes a window, the analysis module 111 may locate this step of closing the window as a step included in the list so that analysis module 111 may signify one frame of the plurality of frames making up the step of closing a window as a representative frame of the action of closing a window while classifying the remaining frames as duplicative frames.

After analysis module 111 has made its determination of whether a step should be represented as either a full motion video clip or a single still motion screen shot, modification module 112 will modify the steps accordingly. In modifying the recorded steps, modification module 112 may operate to delete frames that are deemed duplicative and keep frames that are deemed representative. Thus, modification module 112 may keep the single frame signified by analysis module 111 as representative of the step of depressing a mouse button while deleting the remaining frames that were signified by analysis module 111 as duplicative. Likewise, modification module 112 may keep all frames making up the drag and drop procedure as those frames were signified by analysis module 111 as representative of the drag and drop procedure. Therefore, when the duplicative steps are deleted and the representative frame is kept, modification module 112 effectively modifies the still motion step so that the still motion step is now represented by a single frame or still image screen shot. Accordingly, when all frames are indicated as representative of a full motion step, then modification module 112 may not change the representative frames as they continue to be a full motion video clip of the demonstrated full motion step.

In some embodiments, demonstration development environment 100 may be configured so that modification module 112 may be arranged in such a manner that an IT trainer may activate or select a trigger so that all actions of modification module 112 must be approved by the IT trainer. For example, the manual action may comprise some type of toggle, such as a button, switch, computer key, click by a mouse, and the like. The present invention may also be arranged in some embodiments so that an IT trainer may have the option to opt-in or opt-out of the operation of a trigger. For example, an IT trainer may choose to opt-out of the trigger operation so that the IT trainer does not have to approve the actions of modification module 112. The IT trainer may choose to opt-in in favor of the trigger so that the IT trainer may use a trigger to approve the actions of modification module 112 or so that the actions of modification module 112 will stand only when approved by the activation of a trigger by the IT trainer.

Assembly module 113 operates to assemble/compile the recorded steps into an electronic demonstration movie or presentation. After modification module 112 has modified the steps as required, the remaining frames that make up the demonstrated steps will be assembled/compiled by assembly module 113 into a completed movie file. The electronic demonstration movie may be generated into any one of a number of various file formats, such as a MACROMEDIA FLASH™ file format (SWF), a MACINTOSH PROJECTOR™ file format (HQX), an executable movie file format (EXE), a hypertext markup language movie file format (HTML), and the like. Thus, replay of the electronic demonstration movie may be implemented within a simple framework, such as an interactive multimedia runtime container (iMRC) like the MACROMEDIA FLASH™ player. The electronic demonstration movie is such that viewers will be unable to determine if any steps that were originally recorded in full video by recording module 110 have been scaled down from a full motion video clip to a single still motion screen shot. Thus, when the single frame representing the depression of the mouse step and the frames representing the drag and drop procedure are assembled into a movie, the demonstration movie will appear as a continuous stream of frames so that a viewer is unable to determine that some of the frames that were originally captured as part of the depressing mouse button step have been deleted.

In one embodiment of the present invention, demonstration development environment 100 may present the frames to be compiled into an electronic movie to the IT trainer before the frames are compiled into the demonstration movie by assembly module 113. By presenting the frames to the IT trainer, the IT trainer may edit the frames before the final demonstration presentation is generated. For example, when the electronic demonstration presentation is in the MACROMEDIA FLASH™ environment, the frames may be presented to the IT trainer in the FLV format. Thus, the IT trainer may edit the FLV format before it is compiled into an SWF format. Thus, demonstration development environment 100 may also comprise edit module 114. Edit module 114 provides the capability to edit the recorded full motion video files, the frames indicated as a representative frame of a step that can be represented as a single still motion shot, and the assembled movie file. Thus, after analysis module 111 has analyzed the recorded steps and modification module 112 has modified the recorded steps as required, an IT trainer may edit the various frames. Demonstration development environment 100 may then compile the plurality of frames including any frames that may have been edited into a completed movie file, such as a SWF or the like. The IT trainer may edit the various frames by using an iMAE, such as MACROMEDIA'S MACROMEDIA FLASH™.

In an alternative embodiment of the present invention, demonstration development environment 100 may also comprise preservation module 115. Preservation module 115 may operate to store all recorded frames until the electronic demonstration movie is generated. However, in other embodiments, preservation module 115 may be configured to permanently store all recorded frames, to permanently store only the frames that are deleted through modification module 112, to temporarily store the deleted frames until the electronic demonstration movie is generated, or any combination thereof. Preservation module 115 is advantageous as it presents IT trainers with the ability to recall recorded frames if the IT trainer wishes to edit the frames. For example, if demonstration development environment 100 captured the step of depressing a mouse button as three frames and then analyzed and modified this step so that the second frame is the representative frame, the IT trainer may be able to select another frame, such as the first or third frame, as the representative frame as preservation module 115 may have stored all three frames and made the stored frames available to the IT trainer for editing purposes. Preservation module 115 may also allow an IT trainer to select frames from previously recorded steps and use these frames in the process of creating different demonstration movies.

The program or code segments making up demonstration development environment 100 may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 2:
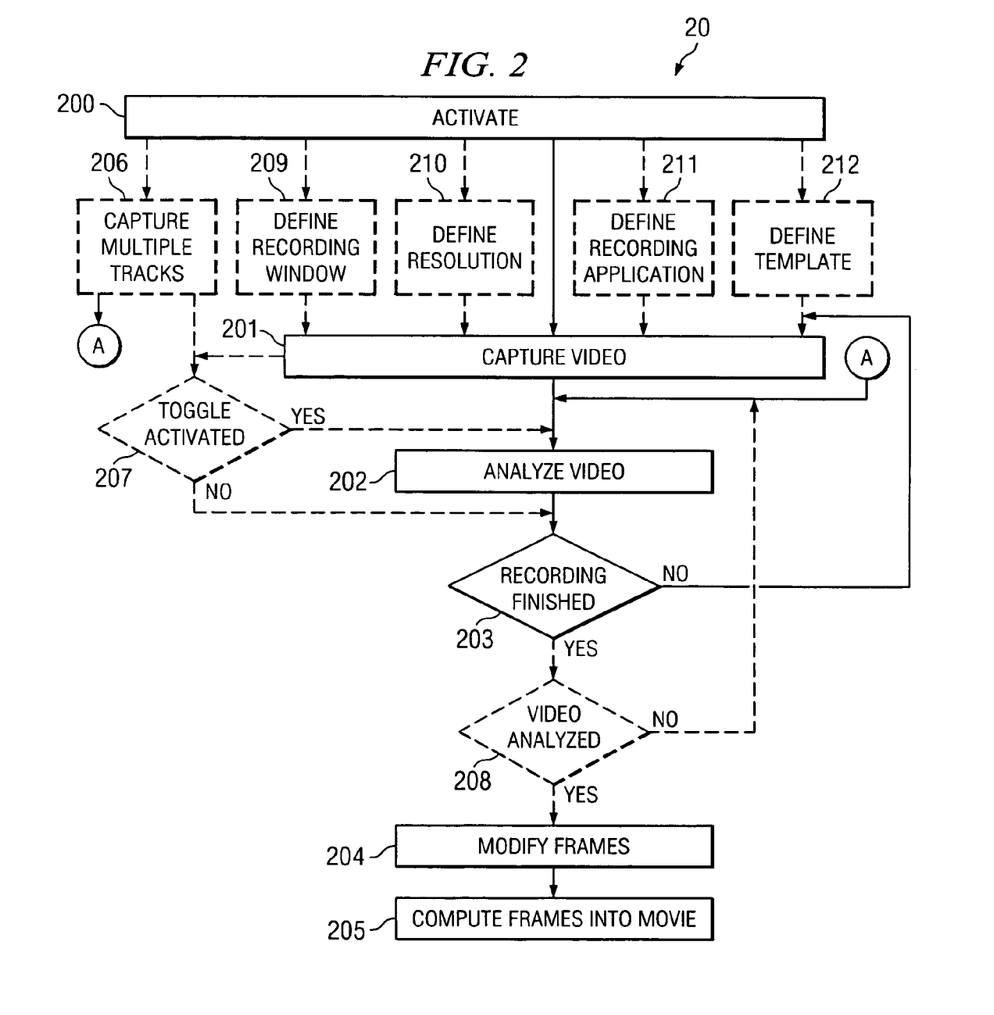
FIG. 2 is a flowchart representing one method of creating an electronic demonstration movie according to one embodiment of the present invention.

FIG. 2 is a flowchart representing one method of creating an electronic demonstration movie according to one embodiment of the present invention. Flow 20 illustrates a method for recording a process performed in a computer environment in order to create an electronic demonstration movie of the recorded process. The movie may be used by IT professionals to help with various training needs. Demonstration development environment 100 is activated in block 200. In block 201, video of the demonstrated process is captured in full motion. After the full motion video is captured, the recording system may analyze all steps of the recorded process in block 202. The recording system will analyze the steps to determine if any of the steps may be accurately represented by a single still motion screen shot as opposed to a full motion video clip. After analysis, flow 20 proceeds to block 203. In block 203, a query is performed to check if the steps to be recorded are complete. If the steps to be recorded are not completed, then flow 20 will revert back to block 201 to continue recording the demonstrated process in full motion video. If the steps to be recorded are complete, then flow 20 advances to block 204.

In block 204, frames may be modified depending on the outcome of analysis block 202. If block 202 determines that a step can be accurately demonstrated as a single still motion screen shot, then at least one of the frames of the recorded video near the frame that can accurately represent the still motion step as a single still motion screen shot among the other recorded steps may be deleted. For example, if video of steps A and B were recorded where step A comprised fifty frames and step B comprised thirty frames, the recording system may analyze both steps A and B. If Step A was designated as a full motion step and step B was designated as a still motion step, then all fifty frames of step A may be maintained while step B may be labeled as a step that can be accurately demonstrated as a single still motion screen shot. Thus, one of the thirty frames making up step B may be designated as the single frame to represent step B as a single screen shot. Thus, assuming that the second frame of step B was chosen to represent step B, then the remaining twenty-nine frames of the thirty frames making up step B may be deleted in block 204. After block 204, flow 20 proceeds to block 205. In block 205, the remaining frames may be assembled/compiled into an electronic demonstration movie.

In an alternative embodiment of the present invention, block 206 may replace block 201 so that flow 20 would proceed from block 200 to block 206 and then from block 206 to block 202. In block 206, the demonstrated process is captured in multiple tracks. The multiple tracks may comprise any one of a track of on-screen data and activity, a track of pointer data, a track of keyboard data, a track of object data, and the like. When the demonstrated process is captured in multiple tracks, the multiple tracks are synchronized in time.

Flow 20 may also be arranged in one embodiment of the present invention to include block 207 before block 202. In block 207, a query is performed to determine if an IT trainer has activated a toggle that will trigger analysis block 202. If the IT trainer has activated the toggle, then flow 20 proceeds from block 207 to block 202 where the recorded steps will be analyzed. If the IT trainer has not activated the toggle, then flow 20 proceeds from block 207 to block 203 to check if recording is finished. In an alternative embodiment including both block 206 and block 207, flow 20 may be arranged such that after the video is captured in multiple tracks in block 206, flow 20 would proceed to block 207 in order to check if a toggle to activate analysis block 202 has been triggered. As described above, if the toggle has been activated, flow 20 will then proceed to block 202, and if the toggle has not been activated then flow 20 will proceed to block 203. The toggle may comprise any one of a button, a switch, a keyboard key, a click of a mouse, and the like.

In an alternative embodiment of the present invention including block 207, flow 20 may also include block 208 before block 204. In block 208, another query is performed to determine if the recorded video has been analyzed. In this embodiment, flow 20 may be arranged such that after the query performed in block 203 indicates that recording is finished, flow 20 will proceed to block 208 to check if the video has been analyzed. If the video has not been analyzed, then flow 20 may proceed back to block 202 to analyze the video. If the query of block 208 determines that the video has been analyzed, then flow 20 may proceed to block 204.

In another embodiment of the present invention, flow 20 may also include block 209. In block 209, a recording window is defined. A recording window defines the area in which recording will occur. For example, if an IT trainer preferred to only record events or steps taking place in the middle of the screen, then a recording window may be defined as the middle of the screen. Flow 20 could also include block 210. In block 210, an IT trainer may define the resolution at which recording will record. For instance, the resolution may be set at a very high value to create a very clear electronic demonstration movie or the resolution may be set at a minimal level where movie resolution is not important.

In yet another embodiment of the present invention, flow 20 may include block 211. In block 211, a recordable application may be defined. After the recordable application is defined, all recording performed in flow 20 would be limited to steps performed within the defined recordable application. For example, if an IT trainer were interested in teaching individuals how to perform various tasks within MICROSOFT CORPORATION'S INTERNET EXPLORER™, then the IT trainer may define the recordable application as INTERNET EXPLORER™. After defining INTERNET EXPLORER™ as the recordable application, then only steps performed within INTERNET EXPLORER™ would be recorded.

Flow 20 may also comprise block 212 in an alternative embodiment. In block 212, an IT trainer may define templates to store various recording options, such as recording speed, recording resolution, recording window, and the like. For example, an IT trainer who will be working on a training movie can define a template storing specific settings related to any number of attributes the first time the IT trainer begins to create the movie. Then, the next time the IT trainer resumes work on the same movie or begins to work on a new movie, the previously defined template can be selected in order to avoid having to define settings every time the IT trainer begins to work on a movie. It should be noted that various embodiments of the present invention may include any one or a combination of the various options described and shown in blocks 206-212.

Figure 3:
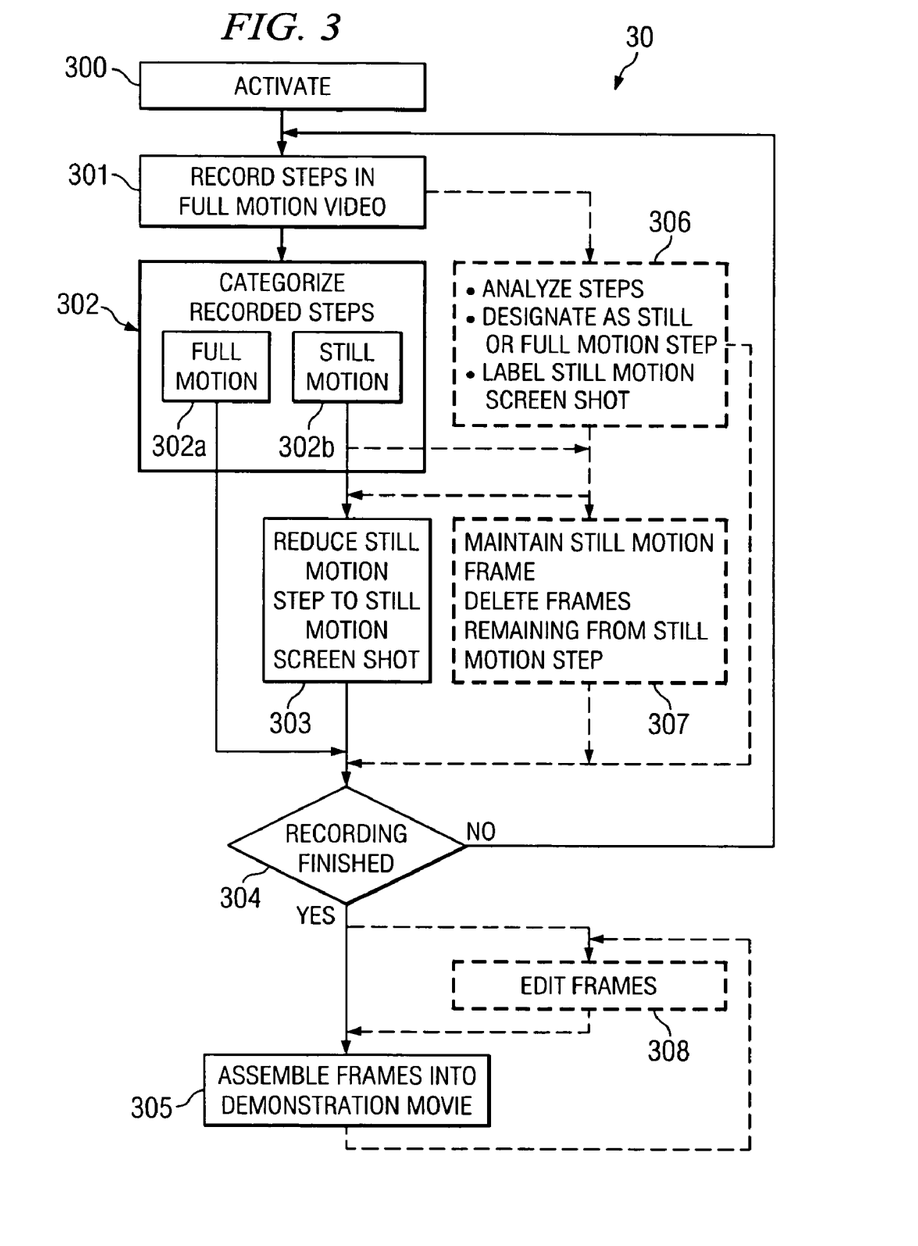
FIG. 3 is a flowchart representing a method of creating an electronic demonstration movie according to another embodiment of the present invention.

FIG. 3 illustrates a flowchart representing another method of creating an electronic demonstration movie according to another embodiment of the present invention. Flow 30 illustrates a method for creating a demonstration presentation. The demonstration presentation may comprise a series of steps carried out within a program of an operating system to achieve some desired result. For example, the steps carried out in performing a drag and drop procedure may be recorded so that a presentation of those steps can be used to teach individuals how to carry out a drag and drop procedure.

Demonstration development environment 100 is activated in block 300. After block 300, the various steps performed within the computer environment are recorded in full motion video in block 301. After block 301, the recorded steps are categorized as either a full motion step 302a or a still motion step 302b in block 302. After the steps are categorized in block 302, then each step classified as a still motion step in 302b may be reduced into a single still motion screen shot in block 303. If the steps recorded contain some full motion steps in 302a, then flow 30 may proceed on to block 304 at the same time flow 30 is proceeding on to block 303. In block 304, a query is done to determine if recording is completed. If recording is not completed, then flow 30 may revert back to block 301 to continue recording. If recording is finished, then flow 30 will proceed to block 305 where the frames are assembled into an electronic demonstration movie.

After the still motion steps 302b are reduced in block 303, flow 30 may proceed on to block 304 to determine if recording is finished. If recording is not finished, then flow 30 may revert back to block 301 to continue recording, and if recording is finished, then flow 30 may proceed to block 305 where the reduced still motion steps and the full motion steps are assembled into some form of electronic demonstration movie.

In an alternative embodiment of the present invention, flow 30 may be arranged so that block 306 replaces block 302. In block 306, all recorded steps will be analyzed. After the steps are analyzed, block 306 will designate which steps can be represented as a single still motion screen shot and which steps can be represented as a full motion video clip. After the steps are designated, block 306 may also label at least one frame of the plurality of frames making up the still motion step as the frame that can illustrate the still motion step as a single still motion screen shot. In such an embodiment, flow 30 may be arranged to flow from block 301 into block 306 and then flow 30 may proceed from block 306 into blocks 303 and 304.

In another embodiment of the present invention, flow 30 may be arranged to include blocks 306 and 307. In such an embodiment, flow 30 may proceed from block 306 into block 307 instead of flowing into block 303 if block 306 has determined that the recorded video includes at least one step that may be represented as a single still motion screen shot. If block 306 determines that the recorded video contains only full motion steps, then flow 30 may proceed from block 306 into query block 304 to check if recording is finished. In block 307, the frame from the plurality of frames making up a still motion step that was labeled in block 306 as the single frame which will represent the still motion step may be maintained in block 307. In addition, the frames from the plurality of frames making up the still motion step that were not labeled or selected to represent the still motion step may be deleted in block 307. After block 307, flow 30 may proceed to query block 304 to determine if recording is finished.

Flow 30 may also be arranged in one embodiment to include block 308. In block 308, an IT trainer may be able to edit the full motion steps and the reduced still motion step before these steps are assembled into an electronic demonstration. In such an embodiment, flow 30 may be arranged such that flow 30 may proceed from block 304 into block 308 and then from block 308 into block 305. Flow 30 may also be arranged so that an IT trainer may edit the frames after they have been assembled into an electronic demonstration movie where flow 30 would flow from block 305 into block 308. It should be noted that various embodiments of the present invention may include any one or a combination of the various options described and shown in blocks 306-308.

Figure 4A:
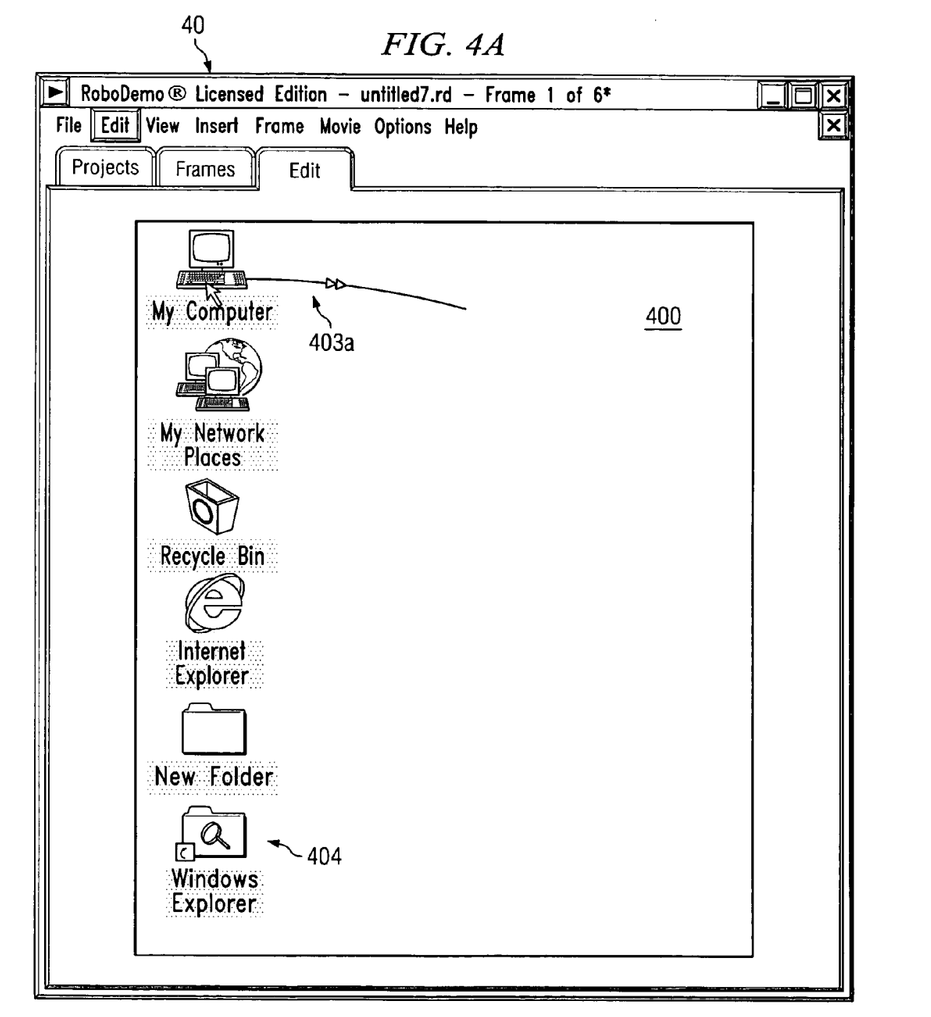
FIGS. 4A-4C are example screenshots illustrating one phase of operation of the present invention according to one embodiment.
Figure 4B:
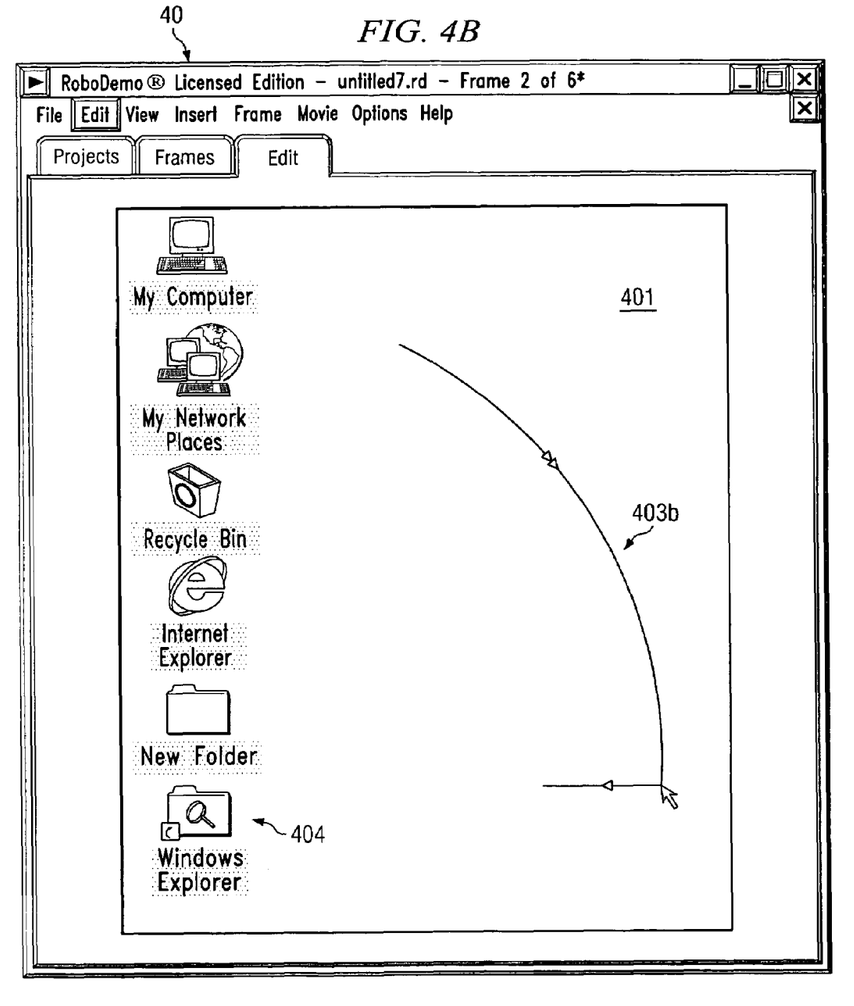
Figure 4C:
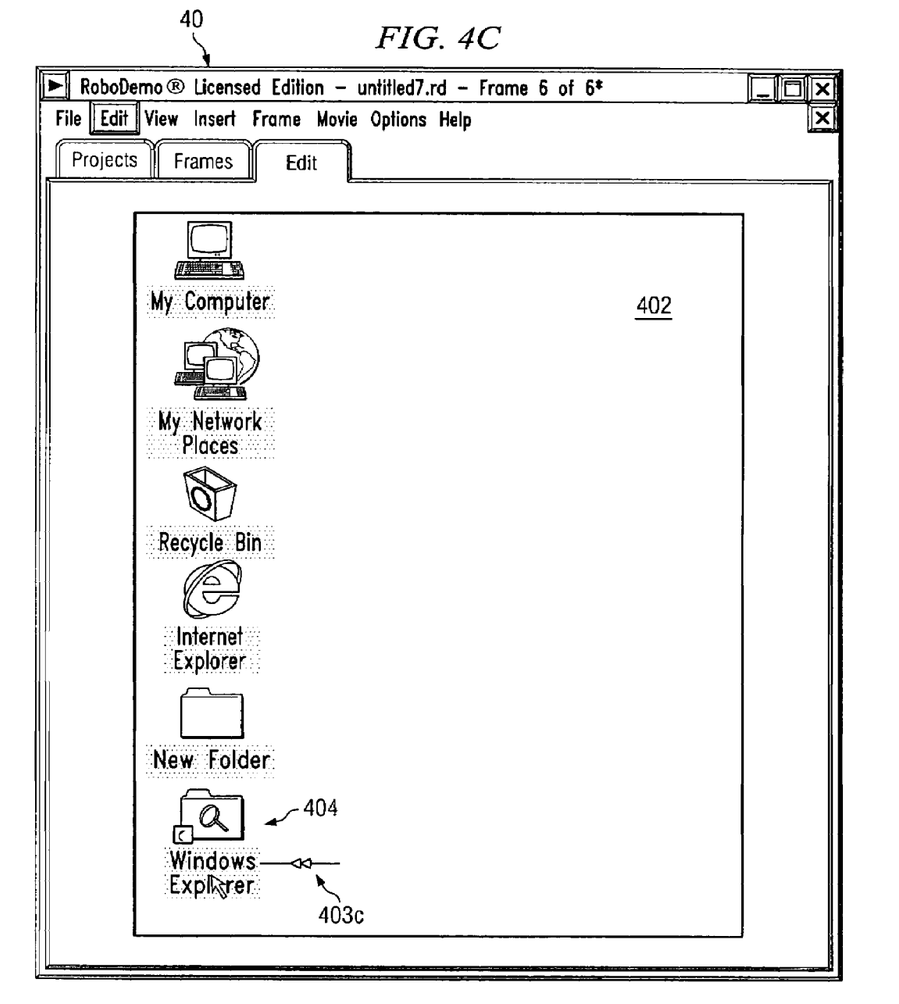

FIGS. 4A-4C illustrate screenshots of an example operation performed by the recording system according to one embodiment of the present invention. Frames 400, 401, and 402, illustrated in FIGS. 4A-4C, illustrate just 3 of several frames that may be recorded by the recording system in recording the operation of selecting "Windows Explorer" icon 404. FIG. 4A illustrates window 40 that includes frame 400. Frame 400 includes pointer image data 403a that illustrates the movement of the mouse from the top left hand of frame 400 down toward "Windows Explorer" icon 404. FIG. 4B illustrates window 40 which now includes frame 401. Frame 401 is the second frame of illustrated frames 400, 401, and 402. Pointer image data 403b illustrates the movement of the mouse from the top of frame 401 down toward the bottom right hand of frame 401. FIG. 4C illustrates window 40 which now includes frame 402. Frame 402 is the third frame of the illustrated frames 400, 401, and 402 captured in recording the operation of selecting "Windows Explorer" icon 404. Pointer image data 403c illustrates the movement of the mouse toward and stopping at "Windows Explorer" icon 404. When the recording system evaluates the step of selecting "Windows Explorer" icon 404, the recording system may recognize this step as a still motion step. The recording system may then select one of the three frames 400, 401, and 402 as the single frame that can adequately represent this operation as a single still motion screen shot. In this example, the key operation may be the selection of "Windows Explorer" icon 404 illustrated in frame 402 of FIG. 4C. Thus, the recording system may select or mark frame 402 of FIG. 4C as the frame that can adequately represent the operation of selecting "Windows Explorer" icon 404. In selecting frame 402 as the frame to be used to represent the operation as a single still motion screen shot, the recording system may delete frames 400 and 401 or save these frames to memory where they may be used for editing. After frames 400 and 401 are deleted or moved to memory, the operation of selecting "Windows Explorer" icon 404, which was originally captured in full motion video, may now be represented as a single still motion screen shot comprised of one single frame 402.

Figure 5A:
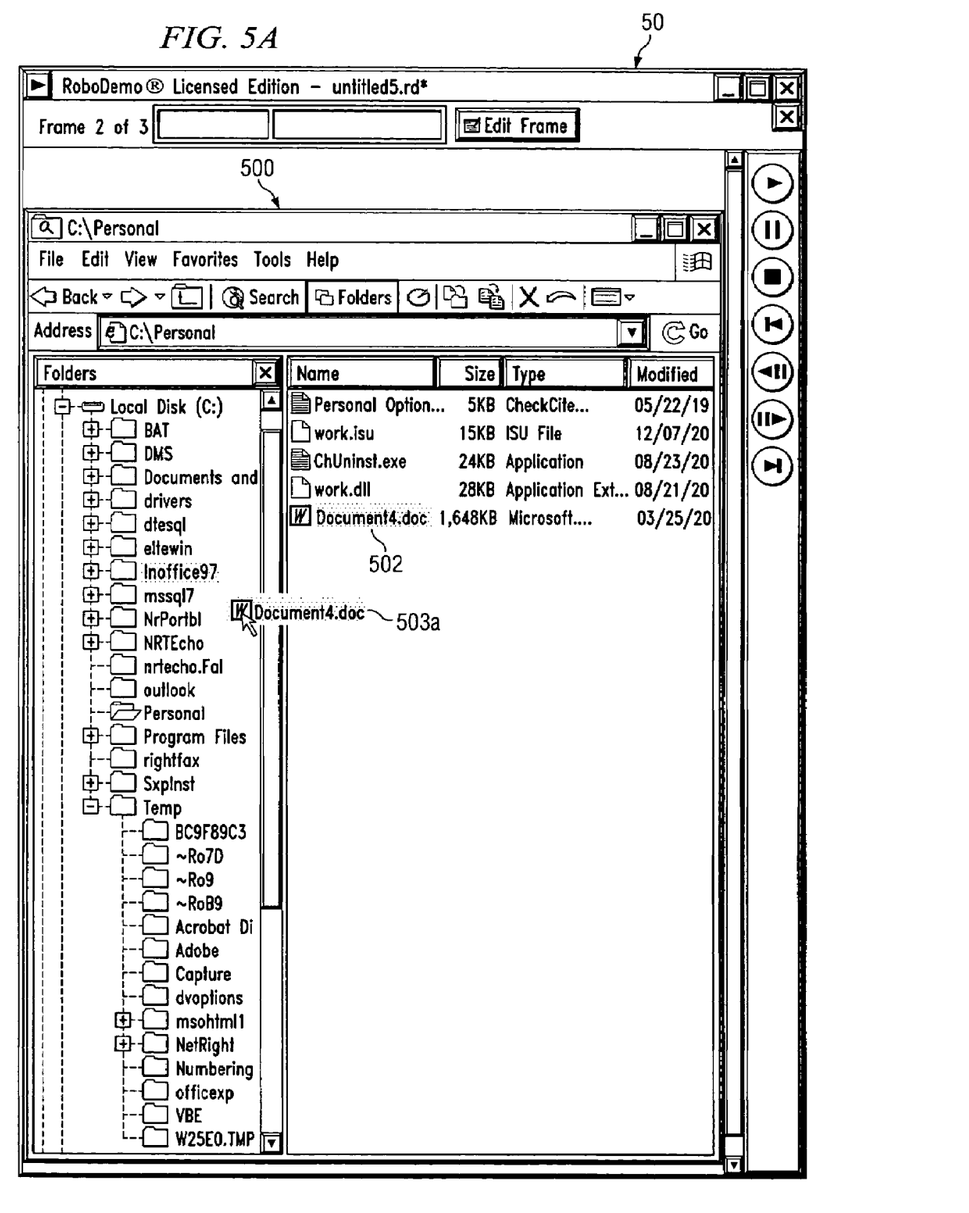
FIGS. 5A-5B are example screenshots illustrating another phase of operation according to one embodiment of the present invention.
Figure 5B:
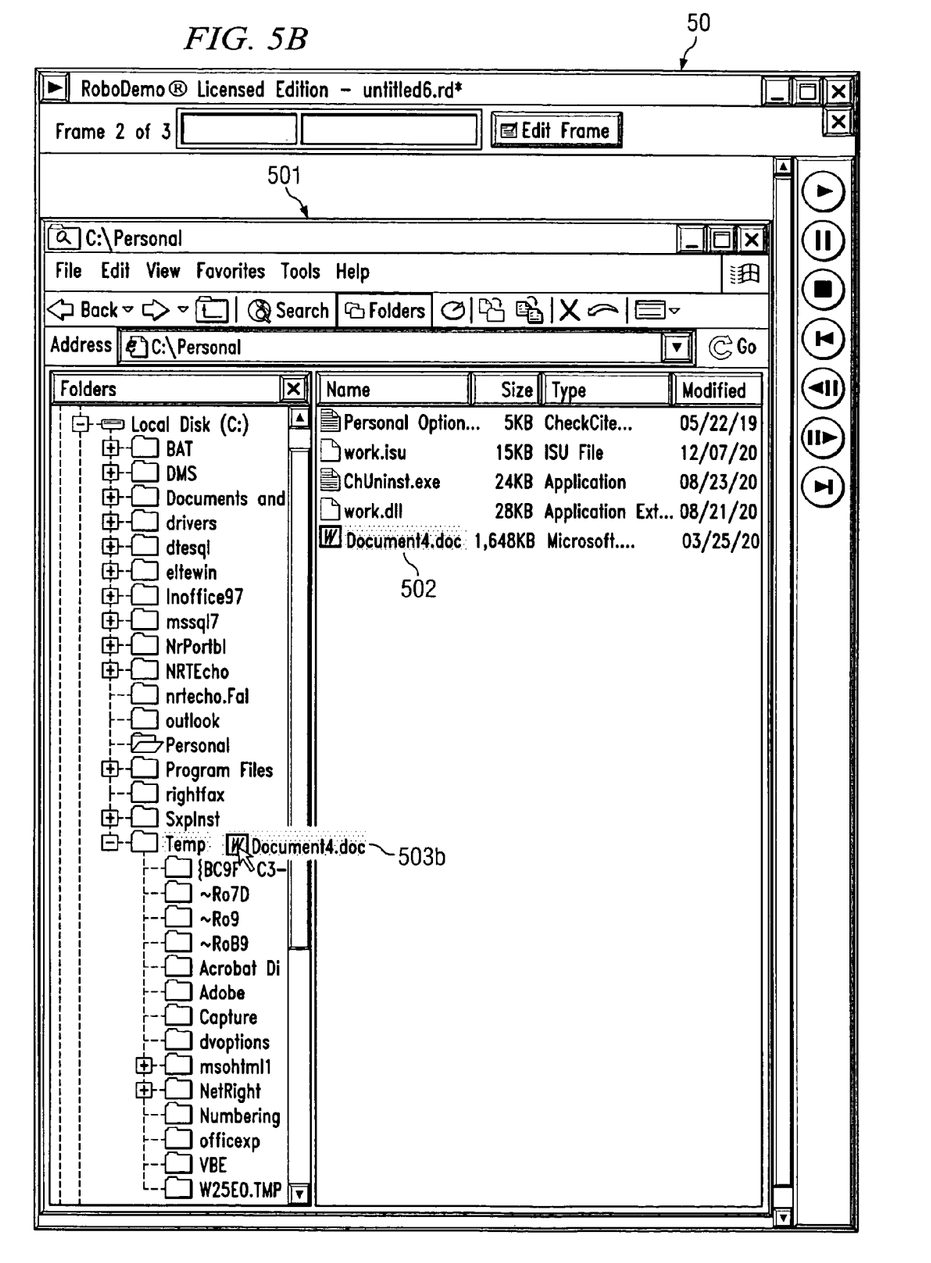

FIGS. 5A-5B illustrate screenshots of another example operation performed by the recording system according to one embodiment of the present invention. Frames 500 and 501 of FIGS. 5A and 5B illustrate just two frames of several frames that may be recorded by the recording system during the operation of a drag and drop procedure. FIG. 5A illustrates window 50 that includes frame 500. Frame 500, represents one frame of illustrative frames 500 and 501 that may be recorded during the operation of a drag and drop procedure. File 502 illustrates the file that is being dragged and dropped from one folder location to another folder location. Transition image 503a illustrates file 502 in the process of being moved from one folder to another folder.

Similar to FIG. 5A, FIG. 5B also illustrates window 50 that now includes frame 501 of the frames making up the drag and drop procedure. Frame 501 represents the action of the drag and drop procedure that occurred in time after frame 500. Frame 501 illustrates transition image 503b which represents file 502 further along in the process of being moved from one location to another location. The actions occurring in frames 500 and 501 are such that the recording system may designate these frames representing the drag and drop procedure as frames that are part of a full motion step. Therefore, the recording system may leave frames 500 and 501 and all other frames making up the drag and drop procedure in full motion video, whereby the frames associated with the drag and drop actions illustrated in frames 500 and 501 may not be deleted. Thus, if the operations of selecting "Windows Explorer" icon 404, illustrated in part by FIGS. 4A-4C, and the drag and drop procedure, illustrated in part by FIGS. 5A-5B, were performed together, the recording system may replace the several frames making up the selection of "Windows Explorer" icon 404 with a single still motion screen shot represented by frame 402 as illustrated above, and the recording system may keep all frames making up the drag and drop procedure in full motion video. Therefore, after going through the two operations, the recording system may assemble the several frames making up the two operations as frames 402 (the single frame to represent the selection of "Windows Explorer" icon 404), 500, 501, and the remaining frames making up the drag and drop procedure that were not illustrated in FIGS. 5A-5B into an electronic demonstration movie. The demonstration movie would be such that viewers would be unable to detect that frames, such as frames 400 and 401 have been deleted from the originally recorded data.

Figure 6:
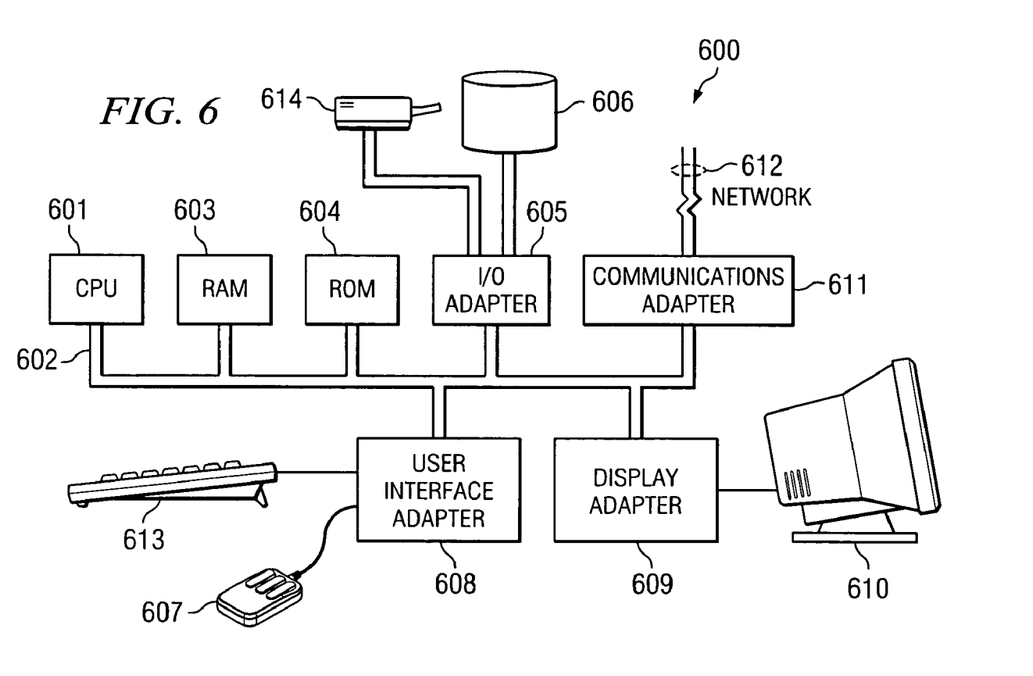
FIG. 6 depicts a block diagram of a computer system which is adapted to use an embodiment of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to printer 614, which would allow the system to print paper copies of information such as documents, photographs, articles, etcetera. Note that the printer may be a printer (e.g. dot matrix, laser, etcetera.), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, etcetera to the computer system 600. The display card 609 is driven by CPU 601 to control the display on display device 610.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for creating an electronic demonstration comprising:
    capturing video of a demonstrated process, said demonstrated process comprising a plurality of steps;
    automatically analyzing each of said plurality of steps by executing logic to determine which step(s) of said plurality of steps is/are suitable for single-frame representation; and
    responsive to said analyzing, deleting one or more frames of said video for said step(s) that is/are suitable for said single-frame representation to create a single-frame representation of said steps(s).

2. The method of claim 1 further comprising:
    assembling said single-frame representation and said video into an electronic demonstration movie.

3. The method of claim 2 wherein capturing video comprises:
    capturing said video in multiple tracks.

4. The method of claim 2 wherein said electronic demonstration movie is assembled into one or more of the following formats:

a MACROMEDIA FLASH™ file format (SWF);
a MACINTOSH PROJECTOR™ file format (HQX);
an executable (EXE) movie file format; and
a hypertext markup language (HTML) movie file format.

5. The method of claim 3 wherein said multiple tracks comprise one or more of:
   a track of screen data;
   a track of pointer data;
   a track of keyboard data; and
   a track of object action data.

6. The method of claim 5 wherein said tracks are synchronized in time.

7. The method of claim 1 wherein said analyzing each of said plurality of steps comprises:
   executing logic to examine said plurality of steps to determine if any of said plurality of steps can be scaled down into a single motion screen shot.

8. The method of claim 1 wherein said video is captured in one or more of:
   an audio interleave video (AVI) file;
   a windows media video (WMV) file;
   an advanced streaming format (ASF) file;
   a flash video (FLV) format file; and
   a Moving Pictures Experts Group (MPEG) format file.

9. The method of claim 1 wherein said analyzing step is activated by a manually operated toggle.

10. The method of claim 9 wherein said toggle comprises one or more of:
    a button;
    a switch;
    a keyboard key; and
    a click of a mouse pointer.

11. The method of claim 1 wherein said capturing video step comprises:
    defining a recording window wherein recording is limited to recording said plurality of steps performed within said recording window.

12. The method of claim 1 wherein said capturing video step comprises:
    defining a recordable application wherein only steps performed within said recordable application are recorded.

13. The method of claim 1 further comprising:
    editing said captured video.

14. The method of claim 1 further comprising:
    maintaining all of said captured video; and
    presenting said maintained video to a user upon request wherein said maintained video can be used for editing.

15. A computer program product tangibly embodied on a computer readable medium with computer program logic recorded thereon for creating an electronic demonstration, said computer program product comprising:
    code for capturing video of a demonstrated process, said demonstrated process comprising a plurality of steps;
    code for automatically analyzing each of said plurality of steps by executing logic to determine which step(s) of said plurality of steps is/are suitable for single-frame representation; and
    responsive to said code for analyzing, code for deleting one or more frames of said video for said step(s) that is/are suitable for said single-frame representation to create a single-frame representation of said steps(s).

16. The computer program product of claim 15 further comprising:
    code for assembling said single-frame representation and said video into an electronic demonstration movie.

17. The computer program product of claim 16 wherein said code for capturing video comprises:
    code for capturing said video in multiple tracks.

18. The computer program product of claim 17 wherein said multiple tracks comprise:
    a track of screen data;
    a track of pointer data;
    a track of keyboard data; and
    a track of object action data.

19. The computer program product of claim 18 wherein said tracks are synchronized in time.

20. The computer program product of claim 15 wherein code for analyzing each of said plurality of steps comprises:
    code for executing logic to examine said plurality of steps to determine if any of said plurality of steps can be scaled down into a single motion screen shot.

21. The computer program product of claim 15 wherein said code for analyzing is activated by a manually operated toggle.

22. The computer program product of claim 15 wherein said code for capturing video comprises:
    code for defining a recording window wherein recording is limited to recording said plurality of steps performed within said recording window.

23. The computer program product of claim 15 further comprising:
    code for maintaining all of said captured video; and
    code for presenting said maintained video to a user upon request wherein said maintained video can be used for editing.

24. A system for creating an electronic demonstration movie of a series of steps performed in a computer environment comprising:
    means for recording said steps in full motion video wherein each step is comprised of a plurality of frames of said full motion video;
    means for classifying each of said recorded steps as one of:
       a still motion step and a full motion step; and
    means for representing said still motion steps with a single frame from said plurality of frames making up said still motion step.

25. The system of claim 24 further comprising:
    means for assembling said plurality frames making up said full motion steps and said single frames making up said still motion steps into said electronic demonstration movie.

26. The system of claim 24 wherein said means for classifying operates while said means for recording is recording.

27. The system of claim 24 wherein said means for classifying operates after said means for recording has finished recording said series of steps.

28. The system of claim 24 further comprising:
    means for editing said still motion steps and said full motion steps.

29. The system of claim 24 wherein said means for classifying is activated by a manually operated toggle.

30. A method of creating a demonstration presentation comprising:
    recording a plurality of steps performed within a computer environment wherein said steps are recorded in full motion video;
    automatically categorizing said recorded steps as one or more still motion steps and one or more fullmotion steps;
    responsive to said categorizing reducing each of said categorized still motion steps into an individual screen shot; and responsive to said categorizing and said reducing, assembling said one or more full motion steps and said individual screen shot(s) into a demonstration presentation.

31. The method of claim 30 wherein said categorizing step comprises:

analyzing each of said recorded steps wherein each of said recorded steps comprises a plurality of frames;

in response to said analyzing, designating which of said recorded steps can be represented as a still motion screen shot and which of said steps can be represented as a full motion video clip; and     labeling at least one frame of said plurality of frames making up one of said recorded steps designated to be represented by a still motion screen shot to illustrate said step as a still motion screen shot.

32. The method of claim 31 wherein said reducing step comprises:

maintaining said labeled frame; and deleting all remaining frames of said plurality of frames making up said step designated to be represented by a still motion screen shot.

33. The method of claim 32 wherein said assembling step comprises:

compiling said maintained frames and said steps designated as being represented as a full motion video clip into an electronic demonstration movie.

34. The method of claim 30 further comprising:

providing a means for editing said one or more full motion steps and said one or more individual screen shots.

* * * * *

UNITED STATES PATENT AND TRADEMARK OFFICE
CERTIFICATE OF CORRECTION

PATENT NO. : 7,373,604 B1  Page 1 of 1
APPLICATION NO. : 10/856428
DATED : May 13, 2008
INVENTOR(S) : Arlyn Asch It is certified that error appears in the above-identified patent and that said Letters Patent is hereby corrected as shown below:

In the Claims:

In Claim 30, Column 14, line 62, delete the portion of text reading "fullmotion" and replace with --full motion--.

In Claim 30, Column 14, line 65, delete the portion of text reading "responsive to said categorizing" and replace with --responsive to said categorizing,--.

Signed and Sealed this

Twenty-ninth Day of July, 2008

JON W. DUDAS
*Director of the United States Patent and Trademark Office*